Jan. 17, 1967  G. S. YARBROUGH  3,299,324
LATCH MEANS FOR HOLDING ELECTRICAL UNIT ENGAGED
AND DISENGAGED FROM BUS BARS
Filed Dec. 31, 1964  2 Sheets-Sheet 1
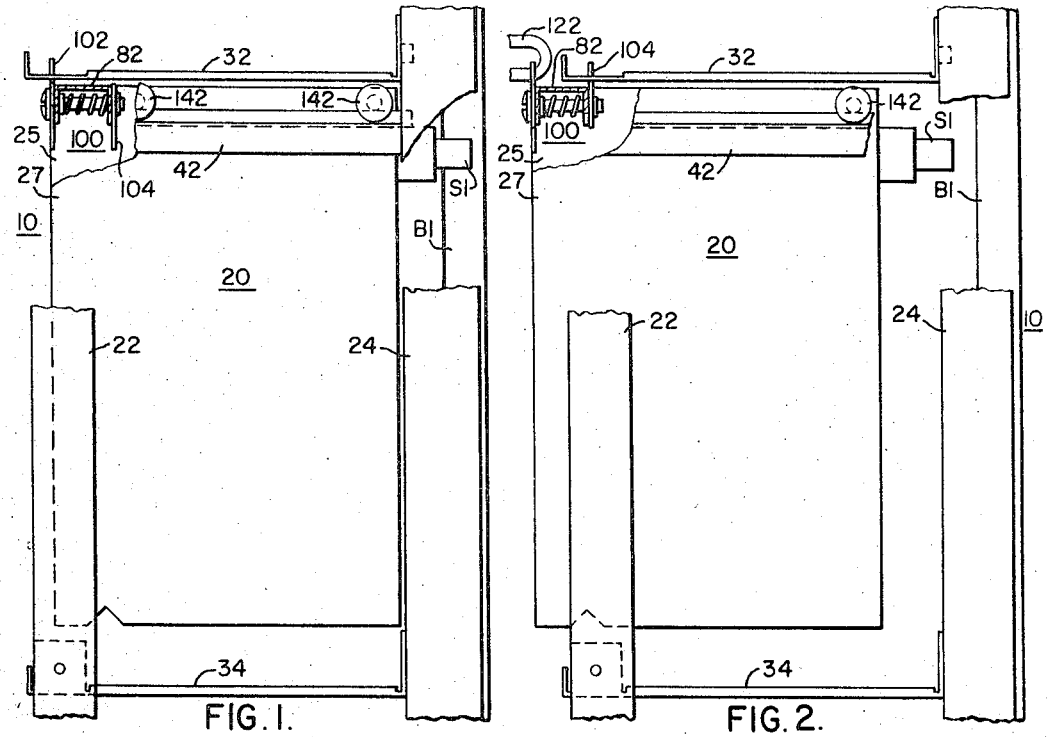
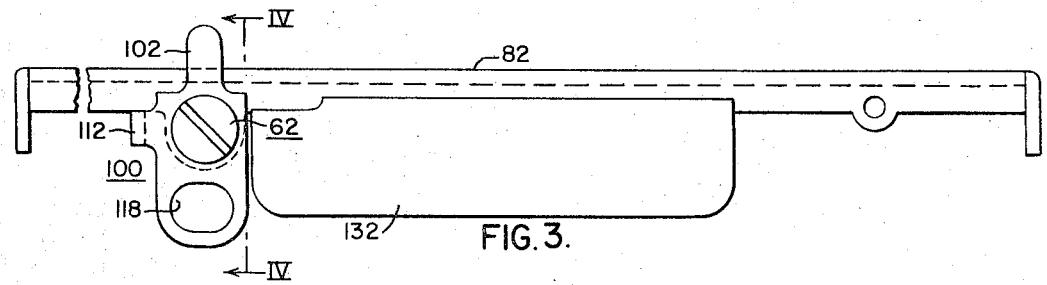
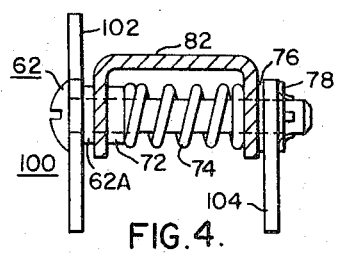
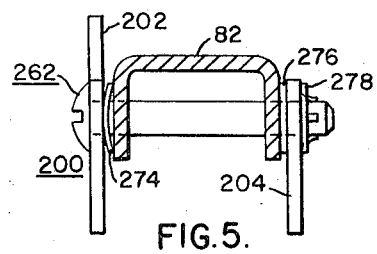
WITNESSES:
Bernard R. Giegner
James F. Young
INVENTOR
Garrett S. Yarbrough
BY
Clement L. McHale
ATTORNEY

United States Patent Office 3,299,324
Patented Jan. 17, 1967

3,299,324
LATCH MEANS FOR HOLDING ELECTRICAL UNIT ENGAGED AND DISENGAGED FROM BUS BARS
Garrett S. Yarbrough, Pittsburgh, Pa., assignor to Westinghouse Electric Corporation, East Pittsburgh, Pa., a corporation of Pennsylvania
Filed Dec. 31, 1964, Ser. No. 422,851
8 Claims. (Cl. 317—120)

This invention relates to switchboards and more particularly to enclosed switchboards for housing control apparatus of the type utilized for controlling distribution circuits which are connected to various electric power utilizing devices.

A switchboard of the type which is utilized for housing control apparatus, such as motor starter units, is described in copending application Serial No. 422,850, filed December 31, 1964 by Edmund W. Kuhn and W. L. McKeithan, Jr., which is assigned to the same assignee as the present application. Switchboards of this type include a plurality of control apparatus units which are removably disposed within an associated housing to engage or electrically connect to bus bars which are disposed in the housing and which may be withdrawn to disengage or disconnect the apparatus units from the associated bus bars. It has been found desirable in switchboards of the type described to provide means for latching or retaining the apparatus units in an engaged position with respect to the associated bus bars and to provide means for latching or locking each apparatus unit in a disconnected or disengaged position in the associated housing in order to permit the maintenance or inspection of the switchboard equipment by operating personnel. In conventional switchboards or control centers of the type described, separate means are employed to provide the different latching or locking functions which are required. It is therefore desirable to provide an improved latching means for a switchboard structure which combines the latching or locking functions just mentioned.

It is an object of this invention to provide an improved switchboard structure of the enclosed type.

Another object of this invention is to provide an improved means for latching a removable unit which is housed in an enclosed switchboard in different operating positions.

Other objects of the invention will, in part, be obvious and will, in part, appear hereinafter.

For a fuller understanding of the nature and objects of the invention, reference should be had to the following detailed description taken in connection with the accompanying drawings in which:

FIGURE 1 is a side elevational view of a portion of a switchboard structure embodying the principal features of the invention showing a removable apparatus unit disposed within the housing of the switchboard;

FIG. 2 is a side elevational view of the structure shown in FIG. 1 showing the removable apparatus unit in a partially withdrawn operating position;

FIG. 3 is an enlarged view in front elevation of a portion of the switchboard structure shown in FIGS. 1 and 2 illustrating the latching means included in the switchboard structure;

FIG. 4 is a side elevational view of the structure shown in FIG. 3, in section, taken along the line IV—IV in FIG. 3;

FIG. 5 is a side elevational view, partly in section, of an alternate construction of the latching means shown in FIGS. 3 and 4;

Figure 6:
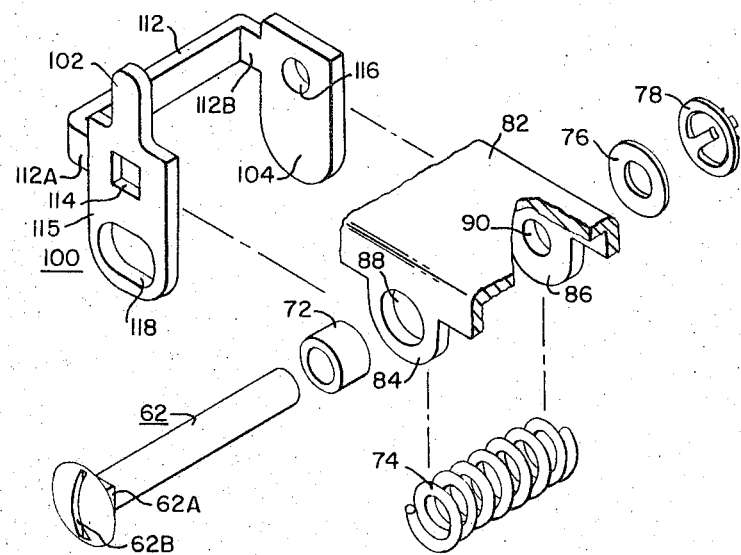
Figure 7:
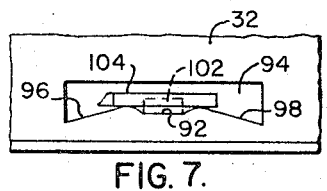

FIG. 6 is an exploded view, in perspective, of certain parts of the latching means shown in FIGS. 3 and 4; and FIG. 7 is an enlarged plan view of a portion of the housing structure of the switchboard structure shown in FIGS. 1 and 2, illustrating the opening in the housing structure with which the latching means shown in FIGS. 3 and 4 cooperates.

Referring now to the drawings and FIGS. 1 and 2 in particular, the switchboard structure 10 shown therein comprises one or more housing compartments which may be stacked vertically to form a vertically extending housing section which may be disposed in side-by-side relation with like housing sections. As illustrated, the housing compartment shown may be formed by providing a first pair of spaced front and rear vertically supporting members 22 and 24, respectively, and the top and bottom wall portions or barrier members 32 and 34, respectively, which are spaced from one another vertically and which extend laterally between the pair of vertically supporting members 22 and 24 to a second pair of similar vertical supporting members which are laterally spaced from the vertical supporting members 22 and 24, shown in FIGS. 1 and 2, to define a substantially rectangular housing compartment. The top and bottom wall members 32 and 34, respectively, may be secured to the vertical supporting members 22 and 24, at each side of the housing compartment described by any suitable means, such as welding or bolts, to provide a housing structure which is self-supporting. In addition, where required, a pair of spaced side wall sheets (not shown) may be provided at the sides of the housing compartment described and secured to the vertical supporting members 22 and 24.

In order to provide support for a removable apparatus unit 20 which is normally disposed inside the housing compartment described, the supporting rail members 42 are disposed inside the housing compartment near the top wall member 32 and secured to the vertical supporting members 22 and 24 at the opposite sides of the housing compartment by any suitable means, such as welding or bolts. The apparatus unit 20, as illustrated in the present drawings, may be a motor starter unit which comprises a circuit breaker and motor starting device of a type suitable for controlling the operation of an electric motor. The apparatus unit 20 includes a pair of spaced spools or rivets 142 which, as illustrated, are rigidly mounted on each side of the apparatus unit 20 to permit the sliding rectilinear movement of the apparatus unit 20 into and out of the housing compartment provided through a front opening with the travel of the apparatus unit 20 being guided by suitable guide means provided on the supporting rails 42, as shown in FIGS. 1 and 2. Alternatively, the spools 142 may be rotatably mounted on the apparatus unit 20 to permit rolling movement of the apparatus unit 20 into or out of the housing compartment on the rail members 42.

In order to supply electric power to the apparatus unit 20, a plurality of laterally spaced vertically extending bus bar conductors, as indicated at B1 in FIGURES 1 and 2, are disposed inside the housing compartment at the rear of the compartment between the rear vertically supporting members 24 (only one shown). As described in detail in the copending application previously mentioned, the vertical bus bars B1 may be positioned and supported by horizontally extending supporting members which are secured to the rear supporting members 24 by any suitable means, such as bolts.

In order to electrically connect the apparatus included in the apparatus unit 20 with the vertical bus bars B1, a plurality of laterally spaced conductor stabs or connectors S1 are disposed or mounted on the apparatus unit 20 at the rear thereof near the top of the apparatus unit 20 to frictionally engage corresponding vertical bus bars B1 when the apparatus 20 is moved into the housing compartment described to the final position shown in FIG. 1 of the drawings. When the switchboard structure 10 is to be inspected or worked on by maintenance personnel and the apparatus unit is to be disconnected from the vertical bus bars B1, the apparatus unit 20 may be moved or actuated in a forward direction away from the bus bar B1, until the stab connectors S1 are electrically disconnected or disengaged from the associated bus bars and separated by a predetermined distance from the bus bars so that operating or maintenance personnel may safely work on the switchboard structure 10, as shown in FIG. 2.

In order to both latch or retain the apparatus unit 20 in a fully engaged position with respect to the associated bus bars, as shown in FIG. 1, and to latch or lock the apparatus unit 20 in a disconnected or disengaged position inside the housing compartment described as shown in FIG. 2, the latching means 100 is mounted on the apparatus unit 20 at the front of the apparatus unit 20. The latching means is supported on a cross member or handle member 82 which extends laterally between the first and second spaced side wall members 25 and 27 of the apparatus unit 20. As best shown in FIGS. 1 and 3, the cross member 82 is generally channel-shaped in cross section and is secured to the side wall members 25 and 27 of the apparatus unit 20 by any suitable means, such as welding or bolts. The opposite ends of the cross member 82 are turned down as shown in FIG. 3 to form flange portions which are secured to the side wall members 25 and 27. The cross member 82 includes a downwardly projecting portion 132 as shown in FIG. 3 which may be formed integrally with the cross member 82 or secured thereto by suitable means, such as welding, to serve as a handle member or portion which can be manually actuated to move the apparatus unit 20 into or out of the associated housing compartment.

In particular, the latching means 100 comprises a generally U-shaped, unitary latching member 112 which includes the first and second spaced leg portions 112A and 112B, respectively, which are interconnected by a bight or yoke portion and which is pivotally supported on the cross member 82 for rotation about an axis which is substantially parallel to the direction of movement of the apparatus unit 20 into or out of the associated housing compartment, as best shown in FIG. 6. The first latching portion 102 of the latching means 100 which is formed integrally with the U-shaped member 112 and extends upwardly from the leg portion 112A, as viewed in FIG. 6, and a second latch portion 104 which is spaced from the first latch portion just described and projects downwardly from and is formed integrally with the leg portion 112B of the U-shaped member 112, as viewed in FIG. 6. The front of the latching means 100 includes a downwardly projecting portion 115, as viewed in FIG. 6, which is formed integrally with the leg portion 112A and includes an opening 118 adapted to receive a padlock (not shown), as will be explained hereinafter.

In order to pivotally support the U-shaped member 112, the cross member or handle 82 includes two integrally formed, spaced bearing portions 84 and 86 which include the aligned openings 88 and 90, respectively. The U-shaped member 112 of the latching means 100 is rotatably supported on a bolt or stud 62, which may be of the type known as a carriage bolt, with the shank of the bolt 62 including a substantially rectangular portion 62A adjacent to the head of the bolt 62. As shown in FIGS. 4 and 6, the shank of the bolt 62 passes through the aligned openings 114 and 116 provided in the leg portions 112A and 112B respectively of the U-shaped member 112 and also through the aligned openings 88 and 90 provided in the bearing portions 84 and 86, respectively of the cross member 82. When the latching means 100 is assembled on the cross member 82, a washer member 76 may be disposed between the cross member 82 and the rear leg portion 112 of the U-shaped member 112 and a retaining nut or ring 78 may be disposed on the bolt 62 at the end of the bolt to maintain the latching means 100 in assembled relationship. It is to be noted that the substantially rectangular portion 62A of the bolt 62 engages the opening 114 which has a similar shape so that when the slot 62B of the bolt 62 is actuated by a suitable tool, such as a screwdriver, the U-shaped member 112 will rotate with the bolt 62.

In order to latch the apparatus unit 20 in the operating position shown in FIGS. 1 and 2, the top wall portion 32 of the housing compartment previously described is provided with a generally rectangular opening 94, as best shown in FIG. 7, which is adapted to receive the latching portions 102 and 104 of the latching means 100 in the different operating positions of the apparatus unit 20, as shown in FIGS. 1 and 2. The top wall member 32 includes the first and second cam surfaces 96 and 98, respectively, along the lower periphery of the opening 94, as viewed in FIG. 7, to guide the movement of the first and second latch portions 102 and 104 of the latching means 100 into a final position intermediate the opening 94 in the recess 92 provided, as shown in FIG. 7.

In order to bias the latch portions 102 and 104 of the latching means 100 into engagement with the recess 92 provided at the top wall member 32 of the housing compartment previously described, the biasing spring 74 is disposed on the bolt 62, as best shown in FIG. 4, with one end of the biasing spring 74 bearing against the depending wall portion of the cross member 82 and the other end of the biasing spring bearing against the sleeve member 72 which is rotatably mounted on the bolt 62 and which in turn bears against the substantially rectangular portion 62A of the shank of the bolt 62, as shown in FIGS. 4 and 6. It is to be noted that the opening 88 in the bearing portion 84 of the cross member 82 is relatively larger than the opening 90 in the bearing portion 86 to accommodate the sleeve 72 which passes through the opening 88.

In the operation of the switchboard structure 10, when the apparatus unit 20 is actuated or moved inwardly to the final position shown in FIG. 1 in which the stab connectors S1 engage and are electrically connected to the associated vertical bus bars B1, the apparatus unit 20 may be latched or retained in the fully engaged position, as shown in FIG. 1, by rotating the U-shaped member 112 of the latching means 100 from a predetermined position which is angularly displaced from the position, shown in FIG. 3, by an angle of substantially 90° in a counterclockwise direction, as viewed in FIG. 3, with respect to the axis of rotation of the latching means 100 to the position shown in FIG. 3, in which the first latching portion 102 projects into the opening 94 of the top wall member 32 of the housing compartment previously described, as indicated in phantom in FIG. 7, with the latching portion 102 being biased against the cam surface 96 and riding up the cam surface 96 until the first latching portion 102 enters the recess 92 provided in the top wall member 32. In other words, by employing a suitable tool such as a screwdriver, the bolt 62 may be manually rotated approximately one-quarter of a turn about the axis of the latching means 100 to the position shown in FIG. 3. It is to be noted that the biasing arrangement provided in the latching means 100 permits a limited degree of play in the dimensional tolerances of the different portions of the latching means 100 and the top wall member, FIG. 7, while providing a positive engagement of the first latching portion 102 against the peripheral portion or recess 92 of the opening 94 provided in the top wall member 32 of the stationary housing structure previously described.

In the operation of the switchboard structure 10, when the first latching portion 102 is rotated from the position shown in FIG. 3, to a position which is angularly displaced from that shown in FIG. 3 by an angle of substantially 90° in a counterclockwise direction to a predetermined position previously mentioned, the apparatus unit 20 is then free to be moved or actuated in a forward direction a predetermined distance to the position shown in FIG. 2 which is displaced from the vertical bus bars B1 to thereby disengage or disconnect the stab connectors S1 from the associated bus bars to permit inspection and maintenance of the switchbaord structure 10. After the apparatus unit 20 is actuated in a forward direction to the position shown in FIG. 2, the U-shaped member 112 of the latching means 100 may be then rotated from the predetermined position just described in which the first projecting portion 102 and the second projecting portion 104 are oriented in a substantially horizontal direction in a counterclockwise direction to actuate or rotate the second latching portion 104 into the opening 94 of the top wall member 32. The second latching portion 104 will ride on the cam surface 98 until the second latching portion 104 is disposed in the recess 92 provided in the top wall member 32. In the latter operating position, the biasing spring 74 may bias the second latching portion into engagement with the recess portion 92 of the top wall member 32 to similarly compensate for any variations in the dimensions of the co-operating parts of the latching means 100 while maintaining a positive engagement of the second latching portion 104 with the top wall member 32 around the opening 94 depending on the relative magnitudes of the force exerted on the apparatus unit 20 by the biasing or compression spring 74 and the force required to move or actuate the apparatus unit 20 with respect to the housing structure and depending on the relative positions of the apparatus unit 20 and the opening 94. It is to be noted that the U-shaped member 112 of the latching means 100 may therefore be rotated approximately one-quarter turn from the predetermined position described to actuate the first latching portion 102 into the opening 94 when the apparatus unit is in the position shown in FIG. 1 or the second latching portion 104 may be rotated approximately one-quarter of a turn about the axis of rotation of the latching means 100 from the predetermined position described into the opening 94 to latch the apparatus unit 20 in the position shown in FIG. 2 in which the apparatus unit 20 is disengaged or electrically disconnected from the associated bus bars. When the latching means 100 is actuated to latch the apparatus unit in the disconnected position shown in FIG. 2 with the second latching portion 104 projecting into the opening 94 as just described, a padlock may then be inserted into the opening 118 provided at the front of the latching means 100 to ensure the safety of operating or maintenance personnel who may then inspect or work on the switchboard structure 10.

Referring now to FIG. 5, an alternate construction as illustrated in a latching means 200, which is similar to the latching means 100 previously described, except that a spring washer 274 is employed rather than the biasing spring 74, as in the latching means 100. The latching means 200 includes a first latching portion 202 and a second latching portion 204 which are identical to the corresponding latching portions 102 and 104, respectively, of the first latching means 100. The bolt 262 of the latching means 200 is identical to the bolt 62 of the latching means 100 with the latching means 200 being maintained in assembled relationship by retaining nut or ring 278 similarly to the retaining nut 78 previously described. A washer member 276 may be provided between the second latching portion 204 and the cross member 82 similarly to the washer mmber 76 previously described. The purpose of the spring washer 274 is to bias the latching portion 202 and possibly the latching portion 204 of the latching means 200 into engagement with the housing wall around the opening 94 provided on the top wall member 32 of the stationary housing structure previously described and similarly to compensate for dimensional variations in the parts of the latching member 200 and the opening 94 provided in the top wall member 32.

It is to be noted that the recess 92 provided in the opening 94 of the top wall member 32 acts as a stop member to accurately position the different latch portions of the latching means 100 or 200 in different operating positions.

It is to be understood that the latching means 100 or the latching means 200 may be disposed or mounted on the apparatus unit 20 either at the top, as illustrated, or at the sides of the apparatus unit 20 in a particular application to engage a corresponding opening provided in the stationary housing structure of the switchboard structure 10. It is also to be understood that the spacing provided between the first and second latching portions of the latching means 100 or the latching means 200 which projects radially outwardly in opposite directions from the axis of rotation of the respective latching means may be varied in a particular application to insure a safe electrically insulating gap between the stab connectors provided at the rear of the apparatus unit 20 and the associated bus bars. It is also to be understood that the bus bars provided in the stationary housing structure may be oriented in a substantially horizontal direction in a particular applicaion rather than a vertical direction, as illustrated.

The apparatus embodying the teachings of this invention has several advantages. For example, the unitary latching means as disclosed eliminates the need for separate latching means in the different operating positions of the associated apparatus unit in a switchboard structure as disclosed. The latching means as disclosed also permits the locking of the apparatus unit in a disengaged position to prevent injury to operating or maintenance personnel which would otherwise result if the apparatus unit were inadvertently reenergized. In addition, the latching means as disclosed is conveniently disposed at the front of the associated apparatus unit to provide the maximum of accessibility and to avoid the risk of inadvertently touching energized parts which would result if the latching means 100 were disposed at a position which is displaced away from the front of the apparatus unit inside the housing structure. Finally, the latching means disclosed is spring loaded or biased to compensate for the dimensional variations in the different parts of the latching means and the associated opening in the stationary housing structure as disclosed.

Since numerous changes may be made in the above described application and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. A switchboard structure comprising a housing having a front opening, one or more bus bars disposed in the housing, a unit disposed to move into and out of the housing through the front opening to engage and disengage said one or more bus bars, a unitary latch member mounted on the unit and having first and second latch portions spaced from one another along a line which is substantially parallel to the direction of movement of the unit, an additional opening in the housinrg, said latch member being movable with respect to the unit to actuate the first latch portion to enter the additional opening when the unit engages said one or more bus bars and to actuate the second latch portion to enter the additional opening when the unit is disengaged from said one or more bus bars.

2. An electrical structure comprising a housing structure having a front opening, a plurality of bus bars disposed in the housing, a unit disposed to move into and out of the housing through the front opening to engage and disengage the bus bars, a unitary latch member pivotally mounted on the unit for rotation about an axis which is substantially parallel to the direction of movement of the unit, an additional opening in the housing structure, the latch member including first and second latch portions spaced from one another along the axis, the first latch portion being actuable to enter the additional opening when the unit engages the bus bars and the second latch portion being actuable to enter the same additional opening when the unit is disengaged from the bus bars by a predetermined distance which varies with the spacing between the first and second latch portions.

3. An electrical structure comprising a housing structure having a front opening, a plurality of bus bars disposed in the housing, a unit disposed to move into and out of the housing through the front opening to engage and disengage the bus bars, a unitary latch member pivotally mounted on the unit for rotation about an axis which is substantially parallel to the direction of movement of the unit, an additional opening in the housing structure, the latch member including first and second latch portions spaced from one another along the axis, the first latch portion being actuable to enter the additional opening when the unit engages the bus bars and the second latch portion being actuable to enter the additional opening when the unit is disengaged from the bus bars by a predetermined distance which varies with the spacing between the first and second latch portions, and means for biasing the first and second latch portions in a predetermined direction with respect to the unit when the respective latch portions enter the additional opening.

4. A switchboard structure comprising a biasing structure having a front opening, a plurality of bus bars disposed in the housing, a unit disposed to move into and be withdrawn out of the housing through the front opening to engage and be disengaged from the bus bars, a unitary latch member pivotally mounted on the unit for rotation about an axis which is substantially parallel to the direction of movement of the unit, the latch member including first and second latch portions spaced along the axis and projecting transversely away from the axis in opposite directions, an additional opening in the housing structure positioned to receive said latch portions one at a time in different operating positions of the unit, the first latch portion being actuable in a first direction with respect to the axis to enter the additional opening when the unit engages the bus bars, the second latch member being actuable in the opposite direction with respect to the axis to enter the additional opening when the unit is disengaged from the bus bars a predetermined distance.

5. A switchboard structure comprising a housing structure having a front opening, a plurality of bus bars disposed in the housing, a unit disposed to move into and be withdrawn out of the housing through the front opening to engage and be disengaged from the bus bars, a unitary latch member pivotally mounted on the unit for rotation about an axis which is substantially parallel to the direction of movement of the unit, the latch member including first and second latch portions spaced along the axis and projecting transversely away from the axis in opposite directions, an additional opening in the housing structure positioned to receive said latch portions one at a time in different operating positions of the unit, the first latch portion being actuable in a first direction with respect to the axis to enter an additional opening when the unit engages the bus bars, the second latch member being actuable in the opposite direction with respect to the axis to enter the additional opening when the unit is engaged from the bus bars a predetermined distance, and means for biasing the latch portions in a predetermined direction with respect to the unit when the respective latch portions enter the additional opening.

6. An electrical structure comprising a housing structure having a front opening, a plurality of bus bars disposed in the housing, a unit disposed to move into and to be withdrawn out of the housing through the front opening to engage and to be disengaged from the bus bars, a generally U-shaped latch member having a pair of spaced leg portions and pivotally mounted on the unit for rotation about an axis which passes through the pair of leg portions and which is substantially paralled to the direction of movement of the unit, first and second latch portions formed integrally with the respective leg portions projecting radially outwardly from the axis in opposite directions, an additional opening in the housing structure disposed to receive the latch portions, the latch member being actuable in opposite directions with respect to the axis from a predetermined position to actuate the first latch portion into the additional opening when the unit engages the bus bars and to actuate the second latch portion into the additional opening when the unit is disengaged from the bus bars a predetermined distance.

7. An electrical structure comprising a housing structure having a front opening, a plurality of bus bars disposed in the housing, a unit disposed to move into and to be withdrawn out of the housing through the front opening to engage and to be disengaged from the bus bars, a generally U-shaped latch member having a pair of spaced leg portions and pivotally mounted on the unit for rotation about an axis which passes through the pair of leg portions and which is substantially parallel to the direction of movement of the unit, first and second latch portions formed integrally with the respective leg portions projecting radially outwardly from the axis in opposite directions, an additional opening in the housing structure disposed to receive the latch portions, the latch member being actuable in opposite directions with respect to the axis from a predetermined position to actuate the first latch portion into the additional opening when the unit engages the bus bars to actuate the second latch portion into the additional opening when the unit is disengaged from the bus bars a predetermined distance, and means for biasing the latch portions in a predetermined direction with respect to the unit when the respective latch portions enter the additional opening.

8. An electrical structure comprising a housing structure having a front opening, a plurality of bus bars disposed in the housing, a unit disposed to move into and to be withdrawn out of the housing through the front opening to engage and to be disengaged from the bus bars, a generally U-shaped latch member having a pair of spaced leg portions and pivotally mounted on the unit for rotation about an axis which passes through the pair of leg portions and which is substantially parallel to the direction engages the bus bars and to actuate the second latch portions formed integrally with the respective leg portions projecting radially outwardly from the axis in opposite directions, an additional opening in the housing structure disposed to receive the latch portions, the latch member being actuable in opposite directions with respect to the axis from the predetermined position to actuate the first latch portion into the additional opening when the unit engages the bus bars and to actuate the second latch portion into the additional opening when the unit is disengaged from the bus bars a predetermined distance, and means for biasing the latch portions in a predetermined direction with respect to the unit when the respective latch portions enter the additional opening, the housing structure surrounding the additional opening including cam surfaces to guide and position the respective latch portions as they are actuated into the latter opening.

References Cited by the Examiner
UNITED STATES PATENTS 2,257,741 10/1941 Gray _____ 70—85
3,066,244 11/1962 Defandorf et al. _____ 317—120

ROBERT K. SCHAEFER, *Primary Examiner.*

W. C. GARVERT, *Assistant Examiner.*